US010699578B2

(12) United States Patent
Noto et al.

(10) Patent No.: US 10,699,578 B2
(45) Date of Patent: Jun. 30, 2020

(54) COLLISION AVOIDANCE SUPPORT DEVICE PROVIDED WITH BRAKING RELEASE MEANS AND COLLISION AVOIDANCE SUPPORT METHOD

(71) Applicant: DENSO CORPORATION, Kariya, Aichi-pref. (JP)

(72) Inventors: Noriyasu Noto, Kariya (JP); Tetsuya Tokuda, Kariya (JP); Yasuhiko Mukai, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 402 days.

(21) Appl. No.: 15/575,316

(22) PCT Filed: May 19, 2016

(86) PCT No.: PCT/JP2016/064911
§ 371 (c)(1),
(2) Date: Nov. 17, 2017

(87) PCT Pub. No.: WO2016/186175
PCT Pub. Date: Nov. 24, 2016

(65) Prior Publication Data
US 2018/0151074 A1 May 31, 2018

(30) Foreign Application Priority Data

May 19, 2015 (JP) .................................. 2015-101814
Mar. 18, 2016 (JP) .................................. 2016-055419

(51) Int. Cl.
G08G 1/16 (2006.01)
B60W 10/04 (2006.01)
(Continued)

(52) U.S. Cl.
CPC ............. *G08G 1/166* (2013.01); *B60W 10/04* (2013.01); *B60W 10/18* (2013.01); *B60W 10/20* (2013.01);
(Continued)

(58) Field of Classification Search
CPC ....... G08G 1/166; G08G 1/162; B60W 50/14; B60W 30/0956; B60W 30/09;
(Continued)

(56) References Cited

U.S. PATENT DOCUMENTS

2005/0083432 A1    4/2005  Honda et al.
2009/0204289 A1*   8/2009  Lehre ................... B60W 30/16
                                                        701/36
(Continued)

FOREIGN PATENT DOCUMENTS

JP      2003-026025         1/2003
JP      2004-058801 A       2/2004
(Continued)

*Primary Examiner* — Yuen Wong
(74) *Attorney, Agent, or Firm* — Maschoff Brennan

(57) ABSTRACT

The likelihood of a collision of a vehicle colliding with an object in front of an own vehicle is determined, and an emergency braking control for avoiding a collision with the object is started in accordance with the determination results. A determination is made as to whether travel environment conditions have been established, from the location at which the vehicle is currently travelling, the situation behind the vehicle, and, the travel state of the vehicle, and the braking control is released when the likelihood of a collision dropped to a predetermined safety level during the period from the start of the emergency braking control until the own vehicle stops, and when the travel environment conditions have been established.

17 Claims, 8 Drawing Sheets

(51) Int. Cl.
  *B60W 10/18* (2012.01)
  *B60W 10/20* (2006.01)
  *B60W 30/09* (2012.01)
  *B60W 30/095* (2012.01)
  *B60W 50/14* (2020.01)

(52) U.S. Cl.
  CPC ........ *B60W 30/09* (2013.01); *B60W 30/0956* (2013.01); *B60W 50/14* (2013.01); *G08G 1/162* (2013.01); *B60W 2552/30* (2020.02); *B60W 2554/00* (2020.02); *B60W 2710/09* (2013.01); *B60W 2710/18* (2013.01); *B60W 2710/20* (2013.01)

(58) Field of Classification Search
  CPC ...... B60W 10/20; B60W 10/18; B60W 10/04; B60W 2554/00; B60W 2552/30; B60W 2710/20; B60W 2710/18; B60W 2710/09; B60W 50/029; B60W 2050/0297; B60Y 2302/05
  See application file for complete search history.

(56) References Cited

U.S. PATENT DOCUMENTS

| | | |
|---|---|---|
| 2009/0326820 A1 | 12/2009 | Shimizu |
| 2012/0140984 A1 | 6/2012 | Miyajima |
| 2012/0239265 A1 | 9/2012 | Kato et al. |
| 2013/0261950 A1 | 10/2013 | Sasabuchi et al. |
| 2014/0343749 A1 | 11/2014 | Minemura et al. |

FOREIGN PATENT DOCUMENTS

| | | |
|---|---|---|
| JP | 2005-028994 A | 2/2005 |
| JP | 2005-143083 | 6/2005 |
| JP | 2006-142904 A | 6/2006 |
| JP | 2012-118871 | 6/2012 |
| JP | 2012-192776 | 10/2012 |
| JP | 2013-124047 A | 6/2013 |
| JP | 2013-228987 | 11/2013 |
| JP | 2014-180986 | 9/2014 |
| JP | 2014-222463 A | 11/2014 |

* cited by examiner

| HANDOVER DESTINATION | PRIORITY ORDER | NOTIFICATION METHOD |
|---|---|---|
| LTC | 1 | ... |
| ACC | 2 | ... |
| CC | 3 | ... |
| LKA | 4 | ... |
| LKW | 5 | ... |
| ⋮ | ⋮ | ⋮ |
| DRIVER | 6 | ... |

(B)

| HANDOVER DESTINATION | PRIORITY ORDER | NOTIFICATION METHOD |
|---|---|---|
| ACC | 1 | ... |
| LKA | 2 | ... |
| DRIVER | 3 | ... |

…

COLLISION AVOIDANCE SUPPORT DEVICE PROVIDED WITH BRAKING RELEASE MEANS AND COLLISION AVOIDANCE SUPPORT METHOD

CROSS-REFERENCE TO RELATED APPLICATION

This application is based on and claims the benefit of priority from earlier Japanese Patent Application Nos. 2015-101814 filed May 19, 2015, and 2016-055419 filed Mar. 18, 2016, the description of which are incorporated herein by reference.

BACKGROUND OF THE INVENTION

Technical Field

The present disclosure relates to a collision avoidance support technology of a vehicle.

Background Art

Recently, the technology for avoiding a collision of a vehicle with an object in front of the vehicle is known. For example, JP-A 2014-222463 discloses the technology for detecting an object in front of the vehicle by a camera or a millimeter wave radar and the like, determining the likelihood that the vehicle collides with the detected object (hereinafter, referred to as the "possibility of a collision"), so as to operate an emergency braking control (a so-called automatic emergency braking) for avoiding a collision with the object when the likelihood of a collision is greater than a predetermined level.

CITATION LIST

Patent Literature

[PTL 1] JP-A 2014-222463

However, in the conventional technology, when the likelihood of a collision dropped to the safety level during the operation of the automatic emergency braking, if a device and the like were configured in order to continue the automatic emergency braking until the vehicle stops without exception, there was the risk of, for example, providing troubles to the driver.

However, in the conventional technology, even though there are cases when the likelihood of a collision dropped to the safety level during the operation of automatic emergency braking, the device and the like were configured in order to release the automatic emergency braking without exception. Therefore, it is considerd that there is the risk of, for example, giving an uneasy feeling to the driver.

SUMMARY

The present disclosure, in consideration of the aforementioned problems, provides a collision avoidance support technology which may further improve the convenience to the driver.

The collision avoidance support device which is one aspect of the present disclosure is provided with a collision likelihood determination means, a braking start means, a travel environment determination means and a braking release means. The collision likelihood determination means determines the likelihood of the vehicle colliding with an object in front of the vehicle. The braking start means starts the emergency braking control for avoiding a collision with the object in accordance with the determination results by the collision likelihood determination means.

The travel environment determination means determines whether the travel environment conditions which are the conditions relating to at least one among the location at which the vehicle is currently travelling, the situation behind the vehicle, and, the travel state of the vehicle have been established. The braking release means releases the emergency braking control when the likelihood of a collision dropped to the predetermined safety level from the start of the emergency braking control by the braking start means until the vehicle stops, and when the travel environment conditions have been established in accordance with the determination results by the travel environment determination means.

According to this type of configuration, when the likelihood of a collision dropped to the safety level at the time of the operation of automatic emergency braking, at least one among the pattern which continues the automatic emergency braking until the vehicle stops, and the pattern which releases the automatic emergency braking can be used in accordance with the traveling scene of the vehicle at that time.

Therefore, according to the present disclosure, it is possible to use and separate both of the aforementioned patterns appropriately, thus, in accordance with the traveling scene of the vehicle, while not providing trouble to the driver, it is possible to prevent the driver from feeling uneasy, and the convenience for the driver can be further improved.

Further, the collision avoidance support method which is one aspect of the present disclosure can, for the aforementioned reason, achieve the same effect as the effect which has already been described in the collision avoidance apparatus of the present disclosure. Note that, the reference numerals in parentheses described in this description and the claims indicate the corresponding relationship between the specific means described in the following embodiments which suggests one mode of the disclosure, and do not limit the technical range of the present invention.

BRIEF DESCRIPTION OF THE DRAWINGS

In the attached drawings:

FIG. 6(A) is an explanatory view of the list prior to setting, and FIG. 6(B) is an explanatory view of the priority order list.

DETAILED DESCRIPTION OF THE PREFERRED EMBODIMENTS

The preferred embodiments to which the present disclosure is applied will be described below with reference to the drawings.

1. First Embodiment

[1-1. Configuration]

[1-1-1. Entire Configuration]

Figure 1:
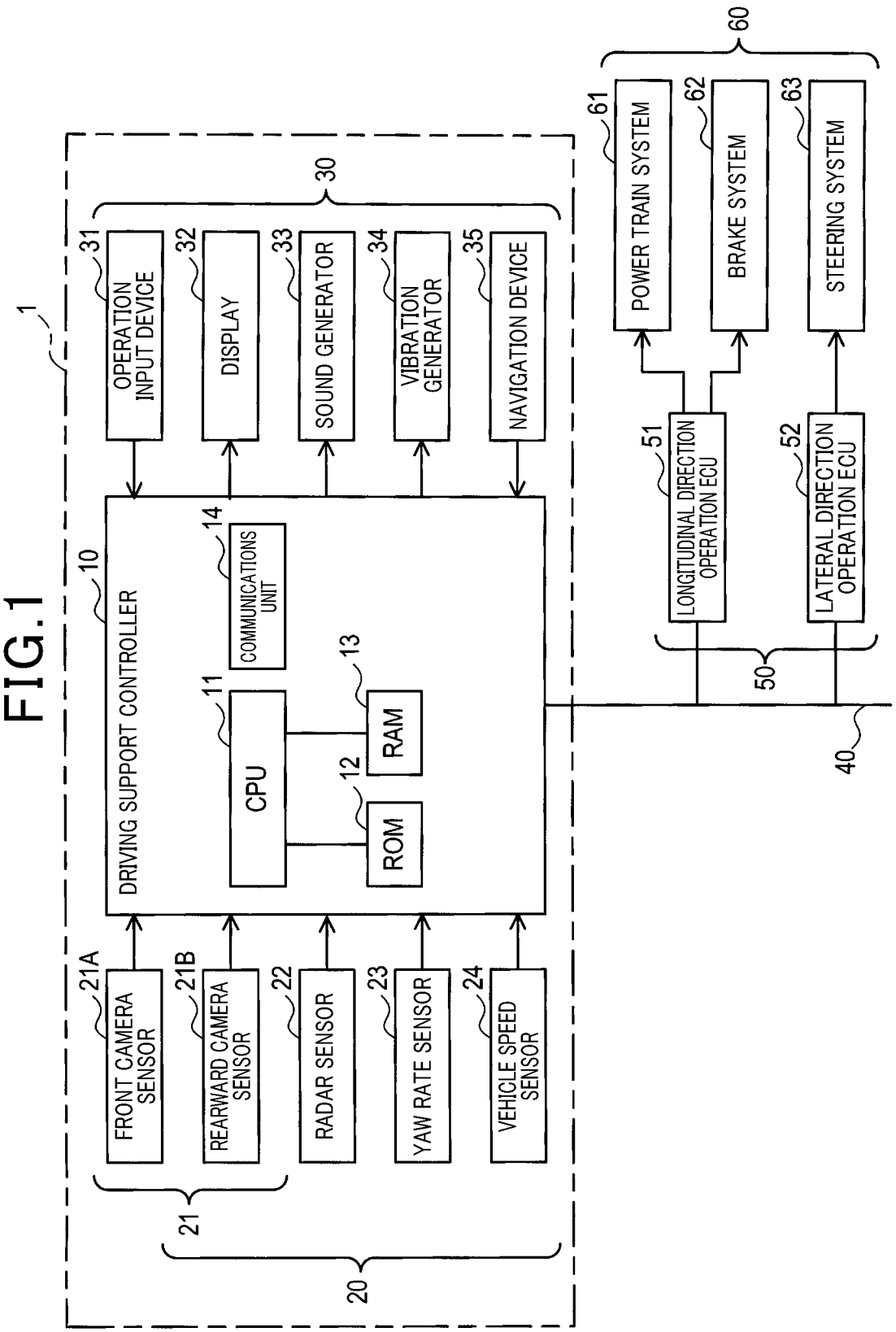
FIG. 1 is a block diagram illustrating the entire configuration of the driving support system 1.

The driving support system shown in FIG. 1 is provided with a driving support controller 10, various sensors 20, a various user interface 30 and a navigation device 35. Further, the driving support system 1 connects to the various ECU 50 via an on-vehicle local area network (hereinafter, referred to as the "on-vehicle LAN") 40. Furthermore, the various ECU 50 connect to the respective control objects 60. The vehicle in which is these components are mounted or installed is referred to below as the own vehicle.

For example, various camera sensors 21, a radar sensor 22, a yaw rate sensor 23, a vehicle speed sensor 24 and the like may be included as the various sensors 20. The detection information and/or the identification information of the various sensors 20 are output/transmitted to the driving support controller 10 and the various ECU 50.

The various camera sensors 21 are constituted by, for example, a well-known monocular camera or a stereo camera which may detect the distance to the object and the horizontal position (or orientation) of the object, and identifies the type, shape, position and the like of the object such as another vehicle, pedestrians, obstacles, installation objects, or lane boundary lines within a captured image. The various camera sensors 21 include a front camera sensor 21A for imaging the front region of the own vehicle, and a rearward camera sensor 21B for imaging the rearward region the own vehicle, and the like.

The radar sensor 22 is constituted by a well-known millimeter wave radar and the like which may detect the distance to the object and the horizontal position (or orientation) of the object, and the relative speed of the object relative to the own vehicle by, for example, irradiating an electromagnetic wave having directivity to the object that is in front of the own vehicle, and receiving the reflected wave, and thus, identifies the type, shape, position and the like of the object.

Note that, the yaw rate sensor 23 is constituted as a well-known sensor for detecting the turning angular velocity of the own vehicle. Further, the vehicle speed sensor 24 is constituted as a well-known sensor for detecting the own vehicle speed based on the rotational speed of the wheels of the own vehicle.

The various user interface 30 include, for example, an operation input device 31, a display 32, a sound generator 33, a vibration generator 34 and the like. The operation input device 31 is constituted by, for example, a switch and a lever installed on a steering wheel spoke of the own vehicle, or a well-known touch panel and the like laminated on the surface of the display 32, and inputs the operation contents of the driver according to the starting, stopping, setting, changes and the like relating to the various functions.

The display 32 is constituted by, for example, a well-known liquid crystal display, an organic EL display, an instrument panel and the like installed in the center console and the dashboard of the own vehicle, and displays the output information relating to the various functions, the information for encouraging the operation input of the driver, the maintenance information and the like relating to components of the own vehicle.

Note that, the sound generator 33 is constituted by the well-known components for outputting a warning sound, a voice message and the like via a speaker. Further, the vibration generator 34 is constituted by, for example, the well-known components installed in the steering wheel and the seat for the driver of the own vehicle, and generates vibrations for alerting or providing a warning to the driver.

The navigation device 35 is constituted by well-known components compatible with an automatic toll collection system (a so-called ETC (Registered trademark)), and by traveling in the ETC lane when the own vehicle uses a toll road, information is wirelessly transmitted and received between roadside machines of the tollbooth so as to be able to pass through the tollbooth without stopping at the tollbooth (specifically, so as to raise the opening/closing bar of the tollbooth).

Note that, the navigation device 35 is a well-known component compatible with a global positioning system (a so-called GPS), and has a map database (DB) containing road map information associated with position information such as the latitude and longitude. The road map information is a table-like DB associated with link information of the links constituting the roads, and node information of the nodes connecting the links. The link information includes the link length, the width, the connection nodes, the curve information and the like, thus, the road shape can be detected using the road map information. Further, the map DB stores additional information such as the type of roads for motorways such as a highway and general roads, or roads for use by pedestrians such as residential areas and streets, the number and type of traveling lanes, the location of ETC-compatible tollbooths and railway crossings and the like.

The driving support controller 10 is provided with one or a plurality of microcomputers having a CPU 11, a ROM 12 (including, for example, EEP-ROM) a RAM 13 and the like, a communications unit 14 for communicating with the various ECU 50 via the on-vehicle LAN 40, and has various functions according to the driving support of the own vehicle. Moreover, the driving support controller 10 implements the various process for realizing the driving support functions of the own vehicle by the CPU 11 executing the program stored in ROM 12 and the like based on the input/received information from the various sensors 20, the operation input device 31, the navigation device 35, the various ECU 50 and the like, and performs the output/transmission of information required for the display 32, sound generator 33, vibration generator 34, the various ECU 50 and the like.

The various ECU 50 include, for example, a longitudinal direction operation ECU 51, a lateral direction operation ECU 52 and the like. Further, a control objects 60 include the power train system 61, a brake system 62, a steering system 63 and the like.

The longitudinal direction operation ECU 51 is connected to the power train system 61 such as the engine, the motor and the transmission and the brake system 62, and determines the control instruction value relating to the driving support in the longitudinal direction of the own vehicle based on the reception information from the driving support controller 10 and directly controls the power train system 61. Specifically, the longitudinal direction operation ECU 51 supplies the control instruction value relating to the driving force to the power train system 61, and supplies the control instruction value relating to the braking force to the brake system 62.

The lateral direction operation ECU 52 is connected to the steering system 63, determines the control instruction value relating to the driving support in the lateral direction of the own vehicle based on the reception information from the driving support controller 10, and directly controls the steering system 63. Specifically, the lateral direction operation ECU 52 provides the control instruction value relating to the steering torque to the steering system 63.

Note that, the various ECU 50 and the driving support controller 10 implements the various processes at predetermined periods of time for realizing a self-diagnosis function of the own vehicle, and outputs the information required by the display 32 and the like. For example, when any abnormality occurs, the longitudinal direction operation ECU 51 stores the occurrence of the abnormality as the self-diagnosis result in each sensor and each actuator constituting a fuel injection system of an engine, and lights a warning lamp such as an instrument panel. Further, for example, when any abnormality occurs in the various sensors 20 and the like constituting the driving support system 1, the driving support controller 10 stores the occurrence of the abnormality as a self-diagnosis result, and displays a message on a liquid crystal display and the like to inform the driver of the occurrence of an abnormality.

[1-1-2. Functional Configuration]

Figure 2:
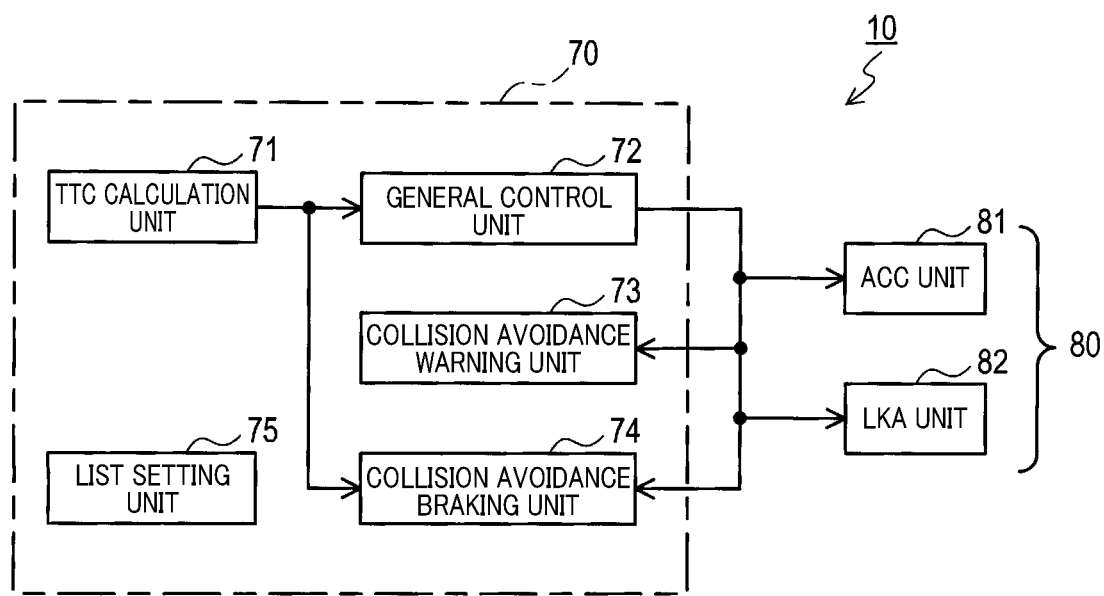
FIG. 2 is a block diagram illustrating the functional configuration of the driving support controller 10.

Next, the functional configuration of the driving support controller 10 will be explained using the block diagram of FIG. 2.

The driving support controller 10 is functionally provided with a collision avoidance support unit 70 and a traveling support unit 80, and has various functions according to the braking support and the traveling support as the driving support of the own vehicle. Specifically, a so-called pre-crash safety system (hereinafter, referred to as "PCS") is installed as the braking support function. Further, a so-called adaptive cruise control (hereinafter, referred to as "ACC") and a lane keeping assistance system (hereinafter, referred to as "LKA") are installed as travel support functions.

Note that, in the present embodiment, LKA refers to the travel support function for preventing a lane deviation by the so-called automatic steering operation when the own vehicle deviates from the lane regardless of the intention of the driver. On the other hand, the travel support function which informs the driver with a warning sound and the like is denoted as a Lane Keep Warning (LKW) when the own vehicle deviates from the lane regardless of the intention of the driver.

Further, in the present embodiment, the travel support function which maintains a predetermined set speed without the driver continuing to press the accelerator pedal is termed Cruise Control (CC), and ACC refers to the travel support function having both CC and an inter-vehicle control function. Furthermore, in the present embodiment, a traveling line within the own vehicle lane is calculated, and the travel support function which controls steering torque along the calculated traveling line, the driving force and the braking force is denoted as a Lane Trace Control (LTC).

These travel support functions (LTC, ACC, CC, LKA and LKW) are functions that are equipped with options or standards in accordance with the vehicle. Therefore, there are also vehicles equipped with at least one travel support function, and there are also vehicles which are not equipped with any travel support function. In the present embodiment, for convenience of explanation, among these travel support functions, it is assumed that the ACC and LKA are equipped in the own vehicle.

Therefore, the traveling support unit 80 is provided with an ACC unit 81 and an LKA unit 82, and the various functions according to the ACC and the LKA are respectively provided. Specifically, the various process for realizing the ACC and the LKA are implemented by the CPU 11 executing the program stored in ROM 12 and the like based on the input/received information from the various sensors 20, the operation input device 31, the navigation device 35, the various ECU 50 and the like, and the information required is output/transmitted to the respective longitudinal direction operation ECU 51 and the lateral direction operation ECU 52.

However, the collision avoidance support unit 70 is provided with a TTC calculation unit 71, a general control unit 72, a collision avoidance warning unit 73, a collision avoidance braking unit 74, and a list setting unit 75, and mainly provides the various functions in accordance with PCS. Specifically, by the CPU 11 executing the program stored in the ROM 12 based on the input/received information from the various sensors 20, the operation input device 31, the navigation device 35, the various ECU 50 and the like, ROM 12, the various processes to be described hereinafter mainly for realizing the PCS are implemented, and the information required is transmitted to the longitudinal direction operation ECU 51 and the like.

The TTC calculation unit 71 performs a tracking process which stores the relative position information (the distance, lateral position and the like) and the relative speed information relative to the own vehicle for a predetermined period of time on the basis of the identification effect and the like for the object detected by at least one of the front camera sensor 21A and the radar sensor 22. Moreover, the process which calculates the time to collision (hereinafter, referred to as "TTC") which is the margin time until the own vehicle collides with the object is implemented by, for example, a well-known method such as dividing the relative distance by the relative speed.

The collision avoidance warning unit 73 implements a process which generates a warning sound in the sound generator 33 and outputs the warning sound via the speaker, when the TTC input from the TTC calculation unit 71 falls below the predetermined warning threshold.

[1-2. Processes]

[1-2-1. Emergency Braking Process]

Figure 3:
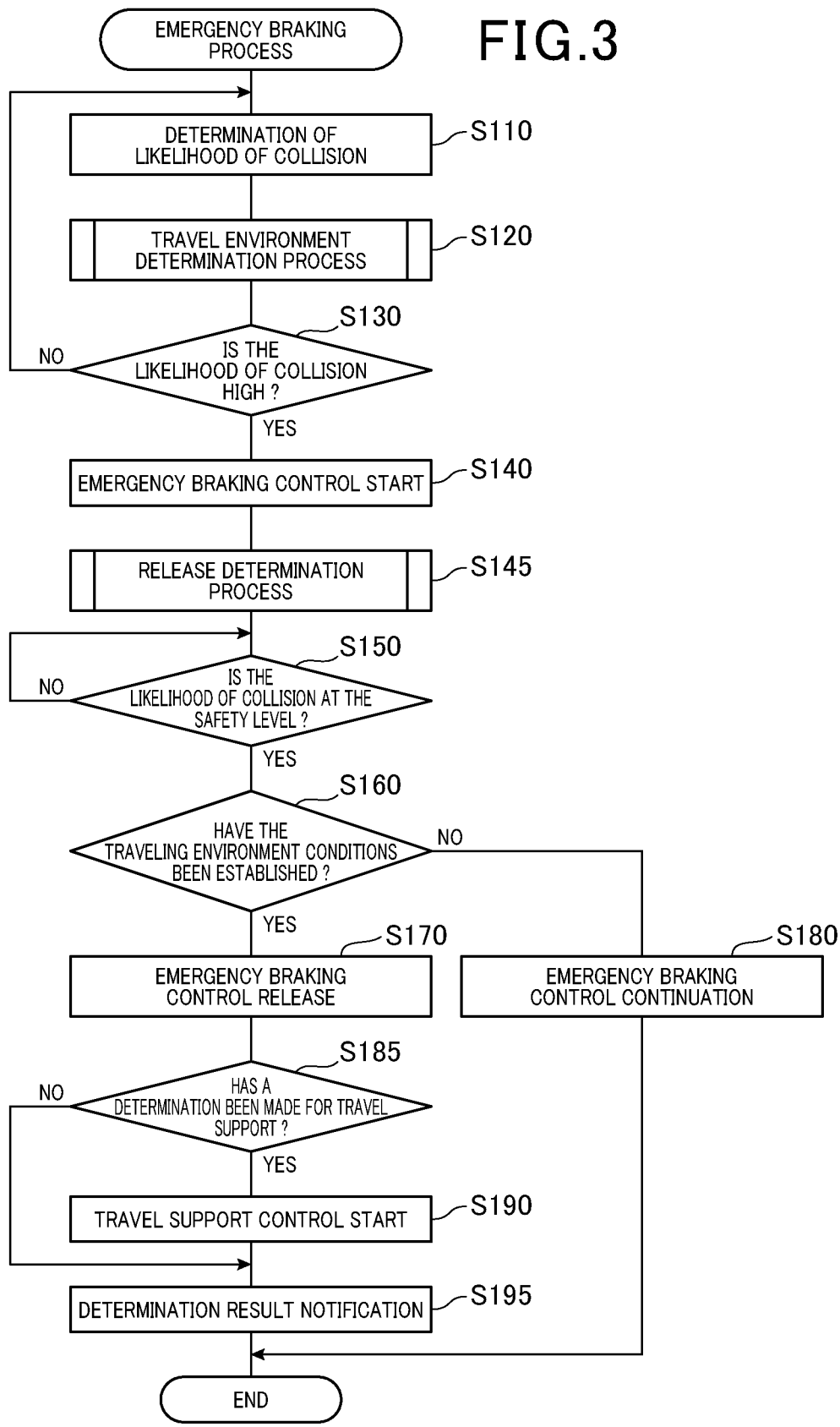
FIG. 3 is a flowchart of the emergency braking process.

Next, the emergency braking process executed by the collision avoidance braking unit 74 and the general control unit 72 will be explained using the flowchart of FIG. 3. Note that, this process is repeatedly executed in each predetermined cycle, for example, while a PCS permission switch (not shown in the drawing) for inputting the operation contents of the starting and stopping relating to the PCS in the operation input device 31 is on.

When this process is started, the collision avoidance braking unit 74, first, determines the likelihood that the own vehicle will collide with an object in front of the own vehicle in Step (hereinafter, referred to as "S") 110. Specifically, when the TTC which is inputted from the TTC calculation unit 71 is below the preset braking threshold as a value lower than the warning threshold, it is determined that the likelihood of a collision is higher than the predetermined level.

On the other hand, the general control unit 72, in S120, starts the process (hereinafter, referred to as the "travel environment determination process") for determining whether the predetermined travel environment conditions were established for the travel environment of the own vehicle. The details of this process are described hereinafter. Note that, the travel environment conditions are the conditions relating to at least one among the location at which the vehicle is currently travelling, the situation behind the vehicle, and, the travel state of the vehicle.

The collision avoidance braking unit 74, in S130, divides the process in accordance with the determination results of S110. Specifically, the collision avoidance braking unit 74 returns to S110 when it was determined that TTC is at braking threshold or more (i.e., the likelihood of a collision is no greater than the predetermined level), and the process proceeds to S140 when it was determined that the TTC is below the braking threshold (in short, the likelihood of a collision is higher than the predetermined level).

In S140, the collision avoidance braking unit 74 starts the emergency braking control (the so-called automatic emergency braking) so that the own vehicle avoids a collision with the object of S110. Specifically, the operation of the automatic emergency braking starts in the brake system 62 by transmitting the control value according to the operation start of the automatic emergency braking to the longitudinal direction operation ECU 51 via an on-vehicle LAN 40.

On the other hand, the general control unit 72, in S145, starts the process (hereinafter, referred to as the "release determination process") which determines whether the travel support control of S190 started by handing over to the release of the emergency braking control based on the priority order list (described hereinafter) specifying the priority order relating to the policy after the release of the emergency braking control of S170. The details of this process are explained hereinafter.

Next, in S150, the general control unit 72 determines whether the likelihood of a collision of S110 dropped to the predetermined safety level. For example, when the TTC of S110 reaches the safety threshold or more which is obtained by adding a predetermined margin value to the warning threshold, it is determined that the likelihood of a collision dropped to the safety level. When it was determined that the likelihood of a collision dropped to the safety level, and the process proceeds to S160, and when it was determined that the state in which the likelihood of a collision exceeds the safety level (in short, the likelihood of a collision is comparatively high) is maintained, S150 is again implemented.

In S160, the general control unit 72 divides the process in accordance with the determination results of S120. Specifically, S160 determines whether the travel environment conditions have been established based on the flag set in the travel environment determination process. When it was determined that the travel environment conditions have been established, and the process proceeds to S170, and when it was determined that the travel environment conditions were not established, and the process proceeds to S180.

In S170, the general control unit 72 outputs the instructions to the collision avoidance braking unit 74 for releasing of the emergency braking control, and the process proceeds to S185. Therefore, the collision avoidance braking unit 74 releases the operation of the automatic emergency braking to the brake system 62 by transmitting the control value according to the operation release of the automatic emergency braking to the longitudinal direction operation ECU5 via the on-vehicle LAN 40.

In S180, the general control unit 72 outputs the instructions for continuing the emergency braking control to the collision avoidance braking unit 74, and this process is terminated. In this case, the collision avoidance braking unit 74 maintains the operation of the automatic emergency braking in the brake system 62 by transmitting the control value in accordance with the operation maintainance of the automatic emergency braking to the longitudinal direction operation ECU5 via the on-vehicle LAN 40. Therefore, the operation of the automatic emergency braking is maintained until the own vehicle stops.

In S185, the general control unit 72 divides the process in accordance with the determination results of S145. Specifically, when it is determined, based on the determination results of the release determination process, that the travel support control for continuously supporting the traveling of the own vehicle after the operation release of the automatic emergency braking has been started, and the process proceeds to S190, and when it was determined that the travel support control has not started (handing over to the normal driving operation by the driver), and the process proceeds to S195.

In S190, the general control unit 72 starts the travel support control, in accordance with the determination results of S145, and the process proceeds to S195. Specifically, when the ACC has been selected in the release determination process, the ACC unit 81 is activated, and the control value required to realize the ACC is transmitted to the longitudinal direction operation ECU5 via the on-vehicle LAN 40 transmit. Therefore, the longitudinal direction operation ECU 51 supplies the control instruction value relating to the driving force to the power train system 61, and implements acceleration control of the own vehicle. More specifically, when the LKA has been selected in the release determination process, the LKA unit 82 is activated, and transmits the control value required to realize the LKA to the lateral direction operation ECU 52 via the on-vehicle LAN 40. Therefore, the lateral direction operation ECU 52 supplies the control value relating to the steering torque to the steering system 63, and implements steering control of the own vehicle.

In S195, the general control unit 72 notifies the determination results of S145 to the driver of the own vehicle, and this process is terminated. Specifically, a voice message is output to the sound generator 33, the message is displayed on the display 32 and vibrations are generated in the vibration generator 34 in order to notify the policy (handover destination) to the driver after the release of the automatic emergency braking. Note that, a notification method such as the message contents was previously specified in each type of the handover destination in the priority order list to be described later.

[1-2-2. Travel Environment Determination Process]

Figure 4:
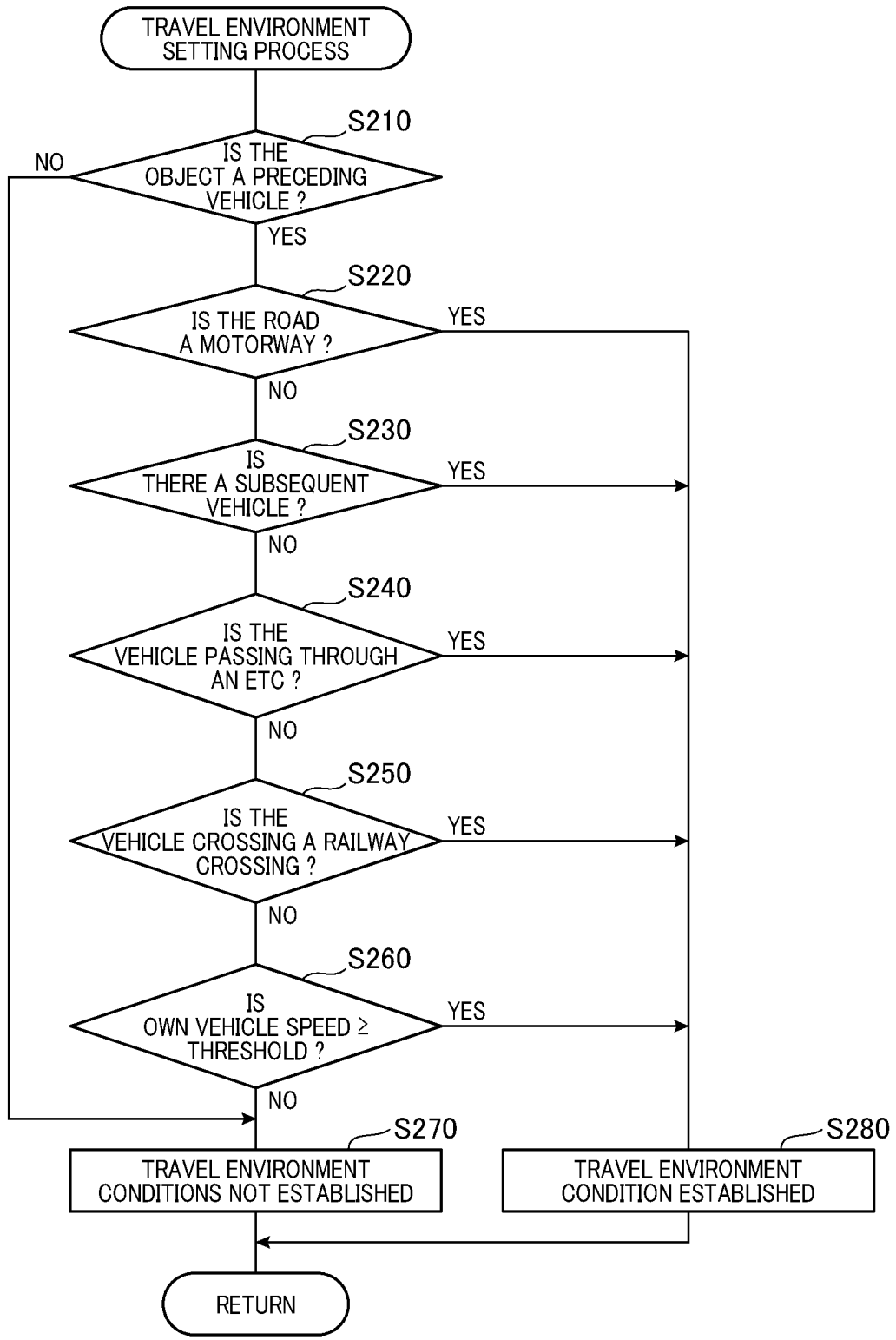
FIG. 4 is a flowchart of the travel environment determination process.

Next, the travel environment determination process executed by the general control unit 72 in S120 will be explained using the flowchart of FIG. 4. This process is repeatedly executed for every predetermined cycle.

When this process is started, the general control unit 72, first, determines in S210, whether the object of S110 is a preceding vehicle as the situation in front of the own vehicle. Specifically, based on the identification effect for the object detected by at least one of front camera sensor 21A and the radar sensor 22, when it was determined that the object is a preceding vehicle, and the process proceeds to S220, and when it was determined that the object is not the preceding vehicle, and the process proceeds to S270. Note that, the preceding vehicle refers to another vehicle in front of the own vehicle traveling in the same lane and in the same traveling direction as the own vehicle.

In S220, the general control unit 72 determines whether the own vehicle is traveling a motorway. Specifically, based on the input information from the navigation device 35, it is determined whether the current position of the own vehicle is on a highway or a motorway such as a general road. When it was determined that the own vehicle is traveling a motorway, and the process proceeds to S280, and when it was determined that the own vehicle is not traveling a motorway, and the process proceeds to S230.

In S230, the general control unit 72 determines whether the subsequent vehicle is present within a predetermined distance of the own vehicle. Specifically, based on the identification effect for the object identified by the rear camera sensor 21B, when it was determined that there is a subsequent vehicle within a predetermined distance of the own vehicle, and the process proceeds to S280, and when it was determined that there is no subsequent vehicle within a predetermined distance of the own vehicle, and the process proceeds to S240. Note that, the subsequent vehicle refers to another vehicle traveling in the same lane and in the same traveling direction as the own vehicle rearward of the own vehicle.

In S240, the general control unit 72 determines whether the own vehicle is passing through an ETC-compliant tollbooth on a toll road. Specifically, based on the input information from the navigation device 35, it is determined whether the current position of the own vehicle is on an ETC-compliant lane within a predetermined distance from a tollbooth. When it was determined that the own vehicle is passing through an ETC-compliant tollbooth, and the process proceeds to S280, and when it was determined that the own vehicle is not passing through the ETC-compliant tollbooth, and the process proceeds to S250.

In S250, the general control unit 72 determines whether the own vehicle is crossing a railway. Specifically, it is determined whether the current position of the own vehicle is a position corresponding to that within a railway crossing based on the input information from the navigation device 35. When it was determined that the own vehicle is crossing a railway crossing, and the process proceeds to S280, and when it was determined that the own vehicle is not crossing a railway crossing, and the process proceeds to S260.

In S260, the general control unit 72 determines whether the own vehicle speed is the predetermined vehicle speed threshold or more. Specifically, when it was determined that the own vehicle speed was the vehicle speed threshold or more based on the detection result of vehicle speed sensor 24, and the process proceeds to S280, and when it was determined that the own vehicle speed is less than the vehicle speed threshold, and the process proceeds to S270.

In S270, the general control unit 72 sets the flag to a value showing that the travel environment conditions of S120 have not been established. However, in S280, the general control unit 72 sets the flag to a value showing that the travel environment conditions of S210 have been established.

[1-2-3. Priority Order List Setting Process]

Figure 5:
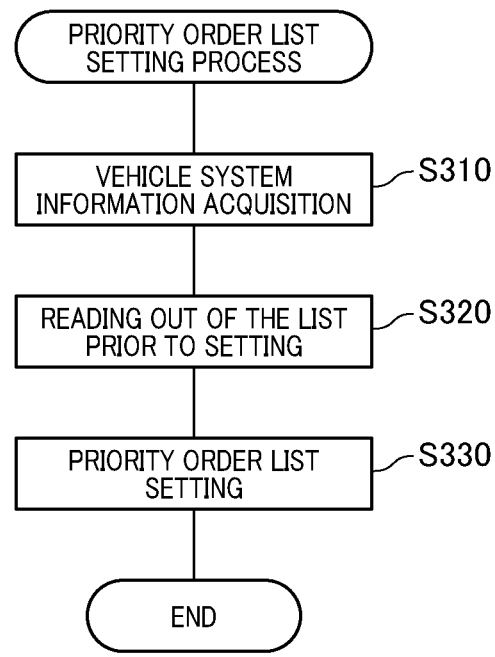
FIG. 5 is a flowchart of the priority order list setting process.

Next, the priority order list setting process executed by the list setting unit 75 will be explained using the flowchart of FIG. 5. Note that, this process starts, for example, at the time the program relating to the function of the general control unit 72 is implemented.

When this process is started, the list setting unit 75, first, acquires the vehicle system information in S310. Specifically, an inquiry is made to the traveling support unit 80, and the type of travel support function installed in the own vehicle is specified. In the case of the present embodiment, the ACC and the LKA will be specified.

Next, the list setting unit 75, in S320, reads out the list prior to the preset setting in the program relating to the function of the general control unit 72. Specifically, as shown in FIG. 6(A), the list prior to setting is a list for setting the priority order list shown in FIG. 6(B), and specifies the priority order and the notification method for each type for the handover destination after the release of the emergency braking control of S170. Other than the travel support functions such as the LTC, ACC, CC, LKA and LKW, options (the driver in the drawing) are provided for returning to normal driving operation without using the travel support function as the handover destination.

Next, the list setting unit 75 sets the priority order list in S330 based on the vehicle system information of S310 and the list prior to setting of S320, and this process is terminated. Specifically, as shown in FIG. 6(B), the information relating to the travel support functions (in the drawing, LTC, CC, LKW, . . . ) which have not been installed in the own vehicle is deleted from the list prior to setting as shown in FIG. 6(A), and the priority order relating to the remaining handover destinations (in the drawing, ACC, LKA and the driver) is renumbered in ascending order without being deleted.

Note that, this process is started, for example, evenwhen a setting relating to the function of the general control unit 72 or a start operation according to the changes was input from the operation input device 31, and the setting of the priority order relating to the handover destination in the priority order list is changed in accordance with operation inputs such as the driver.

[1-2-4. Release Determination Process]

Figure 7:
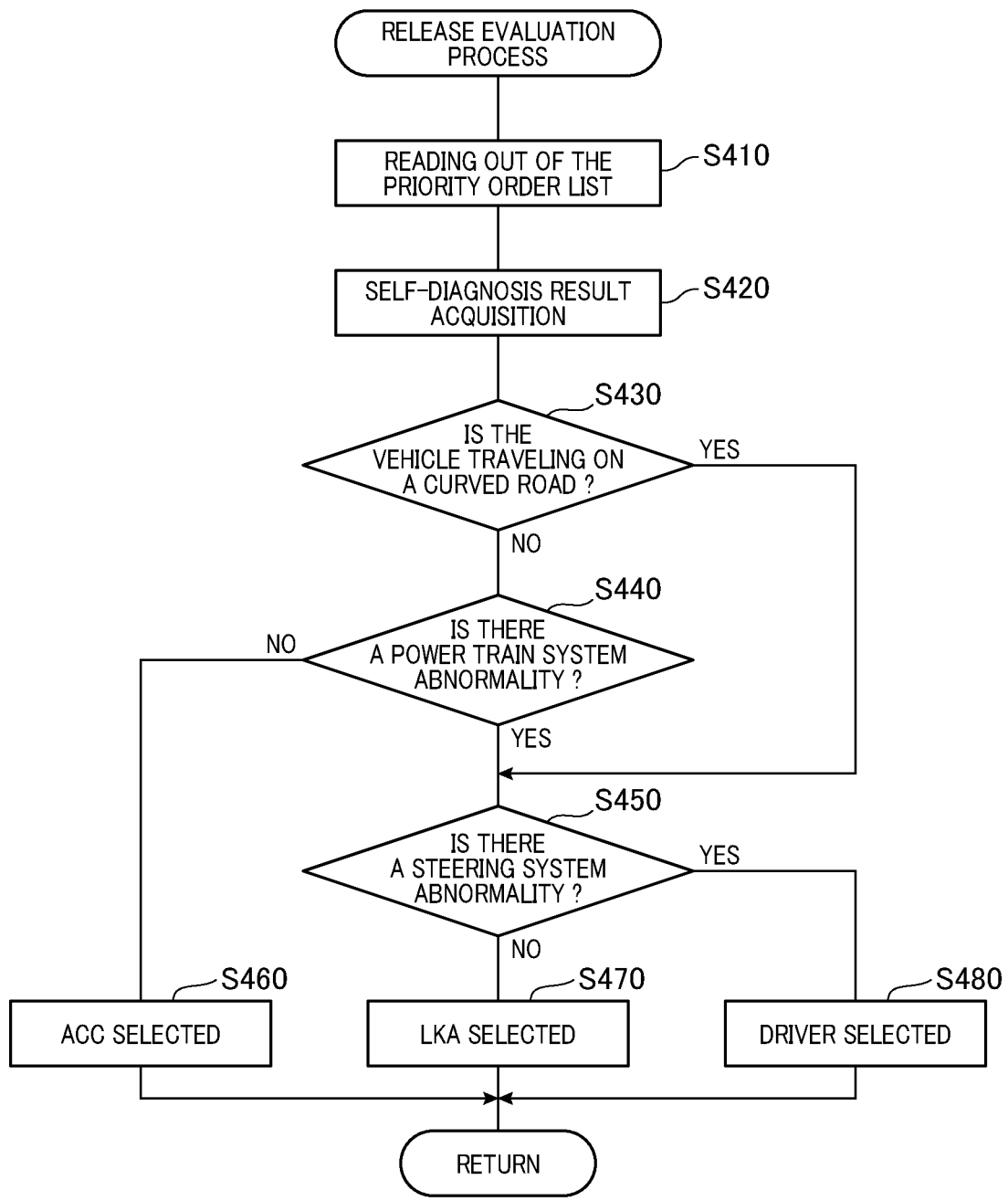
FIG. 7 is a flowchart of the release determination process in the First embodiment.

Next, the release determination process executed by the general control unit 72 in S145 will be explained using the flowchart of FIG. 7.

When this process is started, the general control unit 72, first, in S410, reads out the priority order list. Note that, the priority order list is stored in, for example, the EEP-ROM. In the present embodiment, ACC, LKA and the driver were set in the priority order lis, as the handover destinations in increasing order of priority.

Next, the general control unit 72 acquires the various ECU 50 and the self-diagnosis result of the driving support controller 10 in S420. For example, each sensor and each actuator, constituting the power train system 61, and the occurrence of abnormalities of each sensor and each actuator constituting the steering system 63 can be included as the self-diagnosis result.

Continuing, the general control unit 72 determines in S430, whether the own vehicle is traveling a curving road. Specifically, based on the detected effect of the yaw rate sensor 23 and the input information from the navigation device 35, when it was determined that the own vehicle is traveling a curving road, and the process proceeds to S450, and when it was determined that the own vehicle is not traveling a curving road, and the process proceeds to S440.

In S440, the general control unit 72 determines the presence of abnormal occurrences in the power train system 61, based on the self-diagnosis result of S420. When it was determined that abnormalities have occurred in the power train system 61, and the process proceeds to S450, and when it was determined that abnormalities have not occurred in the power train system 61, and the process proceeds to S460.

In S450, the general control unit 72 determines the presence of abnormal occurrences in the steering system 63 based on the self-diagnosis result of S420. When it was determined that abnormalities have occurred in the steering system 63, and the process proceeds to S480, and when it was determined that abnormalities have not occurred in the steering system 63, and the process proceeds to S470.

In S460, the own vehicle is not traveling on a curving road, and there are no the abnormal occurrences in the power train system 61, thus, the general control unit 72 selects the ACC having the highest priority order in the priority order list as the handover destination, and terminates this process.

In S470, the own vehicle is traveling on a curving road, or there are abnormal occurrences in the power train system 61, and, there are no abnormal occurrences in the steering system 63, thus, the general control unit 72 selects the LKA having the next highest priority order in the priority order list as the handover destination, and terminates this process.

In S480, the own vehicle is traveling on a curving road, or there are abnormal occurrences in the power train system 61, and, there are abnormal occurrences in the steering system 63, thus, the general control unit 72 selects the driver having the lowest priority order in the priority order list as the handover destination, and terminates this process.

[1-3. Effect]

The First embodiment described in detail above obtains the following effects.

(1a) When the likelihood of a collision dropped to the safety level during the operation of the automatic emergency braking, either of the pattern for continuing the automatic braking until the own vehicle stops and the pattern for releasing the automatic braking are used in accordance with the traveling zone of the own vehicle at that time, thus, while not providing trouble to the driver, it is possible to prevent the driver from feeling uneasy by appropriately using both of these patterns together. Therefore, the convenience for the driver can be further improved.

(2a) When the own vehicle is traveling a motorway, the travel environment conditions relating to the location at which the vehicle is currently travelling are established and the automatic emergency braking is released, thus, it is possible to make so that the automatic emergency braking is not released in scenes, for example, when there are pedestrians, and it is possible to prevent the driver from feeling uneasy.

(3a) When the subsequent vehicle is present within a predetermined distance of the own vehicle, the travel environment conditions relating to the situation behind the vehicle are established and the automatic emergency braking is released, thus, it is possible to easily avoid collisions with the subsequent vehicle by releasing the automatic emergency braking in a scene, for example, where the subsequent vehicle is approaching, and it is possible to further improve the convenience to the driver.

(4a) When the own vehicle passes through an ETC-compliant tollbooth on a toll road, the travel environment conditions relating to the location at which the vehicle is currently travelling are established and the automatic emergency braking is released, thus, it is possible to easily prevent troubles for the subsequent vehicle, for example, due to the own vehicle stopping in the vicinity of the tollbooth, and it is possible to not provide troubles to the driver.

(5a) When the own vehicle is crossing a railroad crossing, the travel environment conditions relating to the location at which the vehicle is currently travelling are established, and the automatic emergency braking is released, thus, a train accident and the like due to, for example, the own vehicle stopping within a railroad crossing can be easily prevented, and it is possible to prevent the driver from feeling uneasy.

(6a) When the own vehicle speed is a predetermined threshold or more, the travel environment conditions relating to the travel state of the own vehicle are established, and the automatic emergency braking is released, thus, it is possible to stop the own vehicle in a scene, for example, in which the own vehicle is moving slowly, and it is possible to prevent the driver from feeling uneasy.

(7a) When the automatic emergency braking was released, the convenience for the driver can be further improved by starting the travel support control which continuously supports the traveling of the own vehicle.

(8a) The program can be executed even for vehicles which are, for example, not equipped with the travel support function by a configuration for determining whether the travel support control is started based on the priority order list specifying the priority order relating to the policy after the release of the automatic emergency braking, and the availability of the system can be increased.

(9a) It is possible to prevent the driver from feeling uneasy by notifying the policy (determination results) to the driver after the release of the automatic emergency braking.

(10a) The system can be implemented in various vehicles, for example, by a configuration which selects the travel support control based on the priority order list showing the travel support control for each priority order, regardless of the type of travel support function, and the availability of the system can be increased.

(11a) It is possible to automatically select the travel support function in accordance with the system of the vehicle by a configuration in which the priority order list is set in accordance with the system of the vehicle, thus, it becomes even easier for the implementation of the system to be made to the various vehicles.

(12a) Specifically, the automatic steering control is selected on a curving road, the automatic power train control is selected on a straight road, etc., thus, it is possible to continue the driving support more reasonably by the configuration in which the travel support function is selected in accordance with the travel environment of the own vehicle.

(13a) Specifically, by the configuration in which the travel support function is selected in accordance with the self-diagnosis result of the own vehicle, the travel support function in which a failure has not occurred is selected, etc., and a fail-safe can be performed.

2. Second Embodiment

[2-1. Point of Difference from the First Embodiment]

The Second embodiment has the same basic configuration as the First embodiment, thus, an explanation has been omitted for the common configurations, and the main points of difference are described.

In the release determination process of the abovementioned First embodiment, the handover destination was dynamically selected in accordance with the travel environment and the self-diagnosis result of the own vehicle. With respect thereto, the Second embodiment is different from the First embodiment in the point that the handover destination is statically selected in the release determination process.

[2-2. Processes]

[2-2-1. Release Determination Process]

Figure 8:
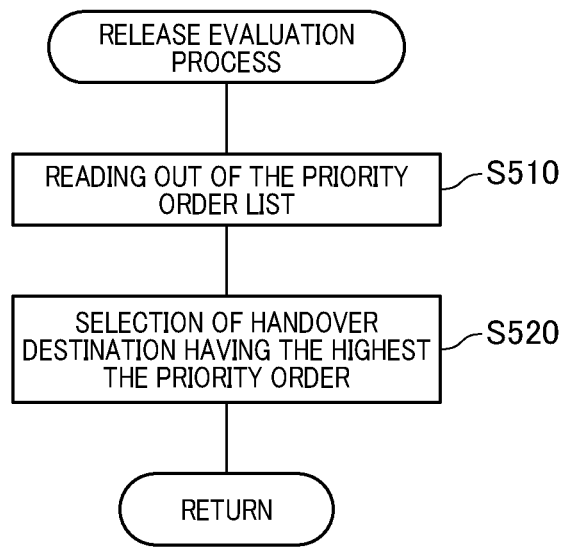
FIG. 8 is a flowchart of the release determination process in the Second embodiment.

Next, the release determination process executed by the general control unit 72 of the Second embodiment in place of the release determination process of the First embodiment (FIG. 7) will be explained using the flowchart of FIG. 8.

In the Second embodiment, when this process is started, the general control unit 72, first, in S510, reads out the priority order list. Next, in S520, the general control unit 72 selects the handover destination in which the priority order is the highest based on the priority order list of S510. In the case of the present embodiment, the ACC having the highest priority order in the priority order list is selected as the handover destination, and this process is terminated.

[2-3. Effect]

The Second embodiment described in detail above, in addition to the effects (1a) to (11a) of the abovementioned First embodiment, obtains the following effect.

(1b) A complicated process is not required when determining the policy after the release of the automatic emergency braking, thus, it is possible to determine the handover destination more rapidly.

3. Other Embodiments

Embodiments of the present disclosure were explained above, but the present disclosure is not limited to the above-described embodiments, and various modifications may be employed.

(3A) In the aforementioned embodiment, the priority order list is set based on the list prior to setting in the priority order list setting process, and the handover destination after the release of the automatic emergency braking was selected based on the priority order list in the release determination process, but is not limited thereto. For example, the priority order list setting process may be omitted, and the handover destination may be selected using the list prior to setting in the release determination process as the priority order list.

(3B) In the First embodiment when the own vehicle is traveling a motorway in the travel environment determination process, the travel environment conditions have been established, but is not limited thereto. For example, when the own vehicle is traveling a motorway in the travel environment determination process, the travel environment conditions have been established, and when the own vehicle is traveling on a general road, the travel environment conditions may not be established.

(3C) A function provided by a single constituent element according to the above-described embodiment may be dispersed as a plurality of constituent elements, or a function provided by a plurality of constituent elements may be integrated into a single constituent element. Further, at least a part of the configuration according to the above-described embodiment may be replaced with a known configuration having similar functions. Further, a part of the configuration according to the above-described embodiment may be omitted. Further, at least a part of the configuration according to the above-described embodiment may be added to or replaced with the configuration of the above-described embodiments. Note that, any embodiment included in the technical concept specified only by the wordings of the scope of claims is an embodiment of the present disclosure.

(3D) Other than the abovementioned driving support system 1, the present disclosure may be realized in numerous forms such as a system in which the driving support system 1 is made as a component, one or a plurality of programs for making a computer function as the driving support system 1, one or a plurality of media which record at least one part of the program, a driving support method and a collision avoidance support method.

REFERENCE SIGNS LIST

1 . . . driving support system, 10 . . . driving support controller, 20 . . . various sensors, 30 . . . various user interface, 40 . . . on-vehicle LAN, 50 . . . various ECU, 60 . . . control objects, 70 . . . collision avoidance support unit, 80 . . . traveling support unit.

The invention claimed is:

1. A collision avoidance support device comprising:
a controller comprising a processor, a non-transitory computer-readable storage medium; and a set of computer-executable instructions stored on the non-transitory computer-readable storage medium that causes the processor to:

determine a likelihood that a vehicle will collide with an object in front of the vehicle,
start an emergency braking control of a braking system to avoid a collision with the object based on the likelihood that the vehicle will collide with the object,
determine whether travel environment conditions which are conditions relating to at least one of a location at which the vehicle is currently travelling, a situation behind the vehicle, and a travel state of the vehicle having been established,
release the emergency braking control of the braking system in response to the likelihood of a collision decreasing to a predetermined safety level during a period from a start of the emergency braking control until the vehicle stops, and in response to the travel environment conditions being determined, and
start a travel support control in order to continue traveling of the vehicle in response to the emergency braking control being released.

2. The collision avoidance support device according to claim 1, wherein the set of computer-executable instructions stored on the non-transitory computer-readable storage medium further causes the processor to set a condition that the vehicle is traveling a motorway as an establishment requirement of the travel environment conditions.

3. The collision avoidance support device according to claim 1, wherein the set of computer-executable instructions stored on the non-transitory computer-readable storage medium further causes the processor to set a condition that a subsequent vehicle is present within a predetermined distance of the vehicle as an establishment requirement of the travel environment conditions.

4. The collision avoidance support device according to claim 1, wherein the set of computer-executable instructions stored on the non-transitory computer-readable storage medium further causes the processor to set a condition that the vehicle is passing through a tollbooth corresponding to an automatic toll collection system on a toll road as an establishment requirement of the travel environment conditions.

5. The collision avoidance support device according to claim 1, wherein the set of computer-executable instructions stored on the non-transitory computer-readable storage medium further causes the processor to set a condition that the vehicle is crossing a railway crossing as an establishment requirement of the travel environment conditions.

6. The collision avoidance support device according to claim 1, wherein the set of computer-executable instructions stored on the non-transitory computer-readable storage medium further causes the processor to set a condition that the speed of the vehicle is a predetermined threshold or more as an establishment requirement of the travel environment conditions.

7. The collision avoidance support device according to claim 1, wherein the set of computer-executable instructions stored on the non-transitory computer-readable storage medium further causes the processor to determine whether the travel support control starts based on a predetermined priority order list which specifies a priority order relating to a policy after the release of the emergency braking control.

8. The collision avoidance support device according to claim 7, wherein the set of computer-executable instructions stored on the non-transitory computer-readable storage medium further causes the processor to notify to the driver of the vehicle whether the travel support control starts based on the predetermined priority order list.

9. The collision avoidance support device according to claim 7, wherein the priority order list contains information showing the travel support control in each priority order, and
wherein the set of computer-executable instructions stored on the non-transitory computer-readable storage medium further causes the processor to select a travel support control based on the predetermined priority order list.

10. The collision avoidance support device according to claim 7, wherein the set of computer-executable instructions stored on the non-transitory computer-readable storage medium further causes the processor to set the priority order list in accordance with a system of the vehicle.

11. The collision avoidance support device according to claim 7, wherein the set of computer-executable instructions stored on the non-transitory computer-readable storage medium further causes the processor to select the travel support control in accordance with a travel environment of the vehicle.

12. The collision avoidance support device according to claim 7, wherein set of computer-executable instructions stored on the non-transitory computer-readable storage medium further causes the processor to select the travel support control in accordance with a self-diagnosis result of the vehicle.

13. The collision avoidance support device according to claim 1, wherein
the travel support control includes an automatic steering control and an automatic power train control.

14. The collision avoidance support device according to claim 13, wherein
the set of computer-executable instructions stored on the non-transitory computer-readable storage medium further causes the processor to determine whether the travel support control starts in which the travel support control is selected in accordance with a travel environment of the vehicle.

15. The collision avoidance support device according to claim 14, wherein
the set of computer-executable instructions stored on the non-transitory computer-readable storage medium further causes the processor to start the automatic steering control, when the vehicle is traveling a curving road.

16. The collision avoidance support device according to claim 15, wherein
the set of computer-executable instructions stored on the non-transitory computer-readable storage medium further causes the processor to determine whether the travel support control based on a predetermined priority order list which specifies a priority order relating to a policy after release of the emergency braking control.

17. A collision avoidance support method, the method comprising:
a collision likelihood determination process for determining, by a processor, a likelihood of the vehicle colliding with an object in front of the vehicle,
a braking start process for starting, by the processor, emergency braking control of a braking system of the vehicle in order to avoid a collision with the object in accordance with a determination result by the collision likelihood determination process,
a travel environment determination process for determining, by the processor, whether travel environment conditions, which are the conditions relating to at least one among a location at which the vehicle is currently travelling, a situation behind the vehicle, and, a travel state of the vehicle having been established,
a braking release process for releasing, by the processor, the emergency braking control of the braking system of the vehicle in response to the likelihood of a collision decreases to a predetermined safety level during a period from a start of the emergency braking control by the braking start process until the vehicle stops, and in response to the travel environment conditions having been established in accordance with a determination result by the travel environment determination process, and
a travel support start process for starting, by the processor, a travel support control in order to continue traveling of the vehicle in response to the emergency braking control being released by the braking release process.

* * * * *